US008077174B2

(12) United States Patent
Lindholm et al.

(10) Patent No.: US 8,077,174 B2
(45) Date of Patent: Dec. 13, 2011

(54) HIERARCHICAL PROCESSOR ARRAY

(75) Inventors: John Erik Lindholm, Saratoga, CA (US); John S. Montrym, Los Altos Hills, CA (US); Emmett M. Kilgariff, San Jose, CA (US); Simon S. Moy, Los Altos, CA (US); Sean Jeffrey Treichler, Sunnyvale, CA (US); Brett W. Coon, San Jose, CA (US); David Kirk, Telluride, CO (US); John Danskin, Providence, RI (US)

(73) Assignee: NVIDIA Corporation, Santa Clara, CA (US)

( * ) Notice: Subject to any disclaimer, the term of this patent is extended or adjusted under 35 U.S.C. 154(b) by 951 days.

(21) Appl. No.: 11/933,993

(22) Filed: Nov. 1, 2007

(65) Prior Publication Data

US 2008/0143730 A1 Jun. 19, 2008

Related U.S. Application Data

(63) Continuation-in-part of application No. 11/305,803, filed on Dec. 16, 2005, now Pat. No. 7,634,637.

(60) Provisional application No. 60/863,985, filed on Nov. 2, 2006.

(51) Int. Cl.
*G06T 5/00* (2006.01)
*G06T 15/50* (2011.01)
*G06T 15/10* (2011.01)
*G06T 1/20* (2006.01)

(52) U.S. Cl. ......... 345/419; 345/426; 345/427; 345/506

(58) Field of Classification Search ............ 345/418, 345/502–506, 419, 426, 427
See application file for complete search history.

(56) References Cited

U.S. PATENT DOCUMENTS

| | | | | |
|---|---|---|---|---|
| 5,493,643 | A | * | 2/1996 | Soderberg et al. ............ 345/505 |
| 5,619,627 | A | * | 4/1997 | Soderberg et al. ............ 345/421 |
| 6,750,859 | B2 | * | 6/2004 | Sowizral et al. ............. 345/418 |
| 6,933,941 | B1 | * | 8/2005 | Peercy et al. ................ 345/428 |
| 7,511,718 | B2 | * | 3/2009 | Subramanian et al. ....... 345/619 |

* cited by examiner

*Primary Examiner* — Hau Nguyen
(74) *Attorney, Agent, or Firm* — Kilpatrick Townsend & Stockton LLP

(57) ABSTRACT

Apparatuses and methods are presented for a hierarchical processor. The processor comprises, at a first level of hierarchy, a plurality of similarly structured first level components, wherein each of the plurality of similarly structured first level components includes at least one combined function module capable of performing multiple classes of graphics operations, each of the multiple classes of graphics operations being associated with a different stage of graphics processing. The processor comprises, at a second level of hierarchy, a plurality of similarly structured second level components positioned within each one of the plurality of similarly structured first level components, wherein each of the plurality of similarly structured second level components is capable of carrying out different operations from the multiple classes of graphics operations, wherein each first level component is adapted to distribute work to the plurality of similarly structured second level components positioned within the first level component.

25 Claims, 6 Drawing Sheets

HIERARCHICAL PROCESSOR ARRAY

CROSS-REFERENCES TO RELATED APPLICATIONS

This application claims the benefit of U.S. Provisional No. 60/863,985, filed on Nov. 2, 2006, the full disclosure of which is incorporated herein by reference.

BACKGROUND OF THE INVENTION

The design of processors for graphics operations and general computing has evolved toward increased parallel computations. Typically, this has been achieved by simply increasing the number of parallel computational units at every natural stage of processing. For example, in graphics processing, in a graphics rendering pipeline having a vertex shader unit, followed by a geometry shader unit, followed by a pixel shader unit, and so on, each of the shader units would be made wider by adding more parallel execution hardware. Thus, the result may be a wider vertex shader unit, followed by a wider geometry shader unit, followed by a wider pixel shader unit, and so on. This has yielded appreciable gains in performance in the past. However, this basic approach has failed to efficiently scale as parallelism continues to increase. Significant limitations are becoming clear as the practice continues. For example, each massively parallel stage in a stage-by-stage pipeline tends to provide little granularity of control of portions of each parallel stage. Also, each massively parallel stage becomes unwieldy and prohibitively time-consuming to design. Furthermore, the level of utilization may decrease, as the massively parallel stage struggles during operation to find sufficiently wide units of work to fully occupy the data path. These mounting drawbacks have indicated that simply increasing parallelism at each stage of a stage-by-stage graphics pipeline is not a sustainable technique for continued improvement. Similar challenges face designers when developing processors for parallel computing. Accordingly, there is a compelling need for a new methodology in the design of high performance graphics processing and general computing equipment.

BRIEF SUMMARY OF THE INVENTION

The present invention relates to apparatuses and methods for performing parallel computations using a processor. The processor comprises, at a first level of hierarchy, a plurality of similarly structured first level components, wherein each of the plurality of similarly structured first level components includes at least one combined function module capable of performing multiple classes of graphics operations, each of the multiple classes of graphics operations being associated with a different stage of graphics processing. The processor comprises, at a second level of hierarchy, a plurality of similarly structured second level components positioned within each one of the plurality of similarly structured first level components, wherein each of the plurality of similarly structured second level components is capable of carrying out different operations from the multiple classes of graphics operations, wherein each first level component is adapted to distribute work to the plurality of similarly structured second level components positioned within the first level component.

The processor may further comprise, at a third level of hierarchy, a plurality of similarly structured third level components positioned within each one of the plurality of similarly structured second level components, wherein each second level component is adapted to distribute work to the plurality of similarly structured third level components positioned within the second level component.

The combined graphics function module may be capable of performing a class of graphics operations carried out based on vertex data, a class of graphics operations carried out based on geometry data, a class of graphics operations carried out based on pixel data.

In one embodiment of the invention, the processor further includes at least one specialized graphics function module capable of performing one class of graphics operations associated with a particular stage of graphics processing. The at least one specialized graphics function module may be capable of performing a class of graphics operations carried out based on frame buffer data for scan out to a display.

The processor may be capable of achieving single-instruction-multiple-data (SIMD) operation on at least one of the first and second levels of hierarchy, by issuing a single instruction to a plurality of components, causing each of the plurality of components to carry out the single instruction using different data. Also, the processor may be capable of achieving multithreaded operation on at least one of the first and second levels of hierarchy, by issuing multiple threads of instructions to each of a plurality of components.

According to one embodiment of the invention, the processor further comprises multiple work distribution units, each work distribution unit capable of distributing work to be performed relating to one of the classes of graphics operations to at least one combined function module. Also, according to one embodiment of the invention, the processor further comprises multiple result collection units, each result collection unit capable of collecting results relating to one of the classes of graphics operations from at least one combined function module.

DETAILED DESCRIPTION OF THE INVENTION

Embodiments of the present invention advantageously provide a hierarchical processor structure that may be used for general computing as well as for graphics processing. The hierarchical structure provides a high level of redundancy. Should a unit break at a particular level of the hierarchy, the broken unit may be disabled and processing continue using a similar unit or units found at the particular level of the hierarchy. A chip designed using this hierarchical structure may advantageously continue processing in the event that a particular functional unit breaks, so long as one or more other operational functional units at the same level of the hierarchy remain operational. For example, embodiments including a graphics processing unit (GPU) having a hierarchical structure comprising one or more rendering pipelines are provided. Redundancy within each level of the rendering pipelines ensure that the GPU may continue to function in the event that one or more components of the rendering pipeline should cease to function.

The hierarchical design provided by the present invention also facilitates the implementation of derivative chip designs. Derivative chip designs may be created by increasing and/or decreasing the number of functional units at a particular level of the hierarchy in order to create a family of chips sharing an underlying architecture. For example, a family of chips may be created from the original design that provide more or less processing power, having higher or lower power requirements, and/or have a smaller or larger form factor than the original design. The family of chips may include a version that includes fewer functional units at one or more levels of the hierarchy to create implementations with a smaller form factor and/or for implementations where a less powerful processor is required. Furthermore, a more powerful version of a chip may also be produced by increasing the number of functional units included in one or more levels of the hierarchy.

Embodiments illustrating these and other benefits of the hierarchical processor structure are provided below.

Illustrative System Level Description

Figure 1:
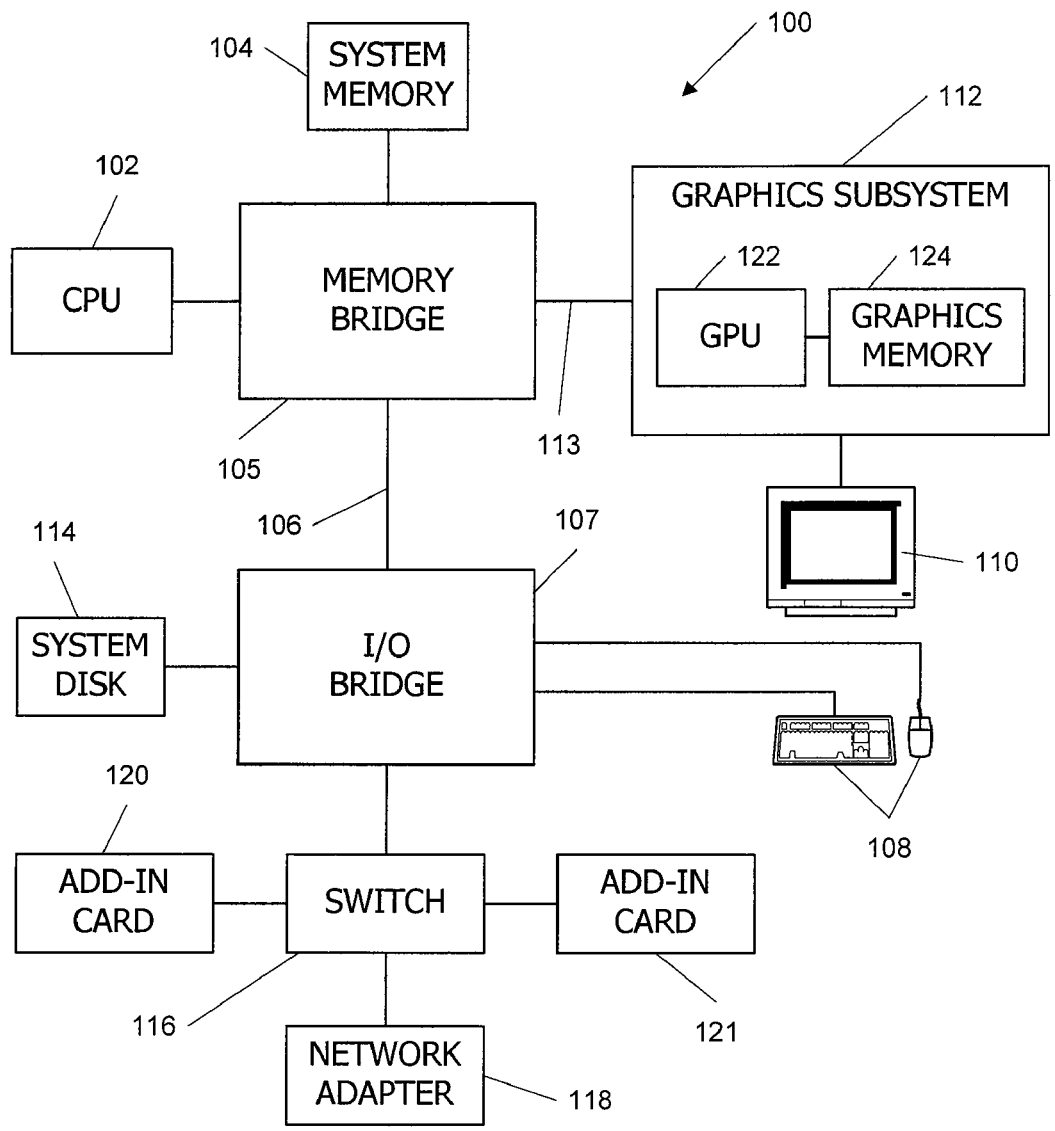
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add in cards or peripheral devices might be supported. In some embodiments, switch 116 is eliminated, and network adapter 118 and add in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
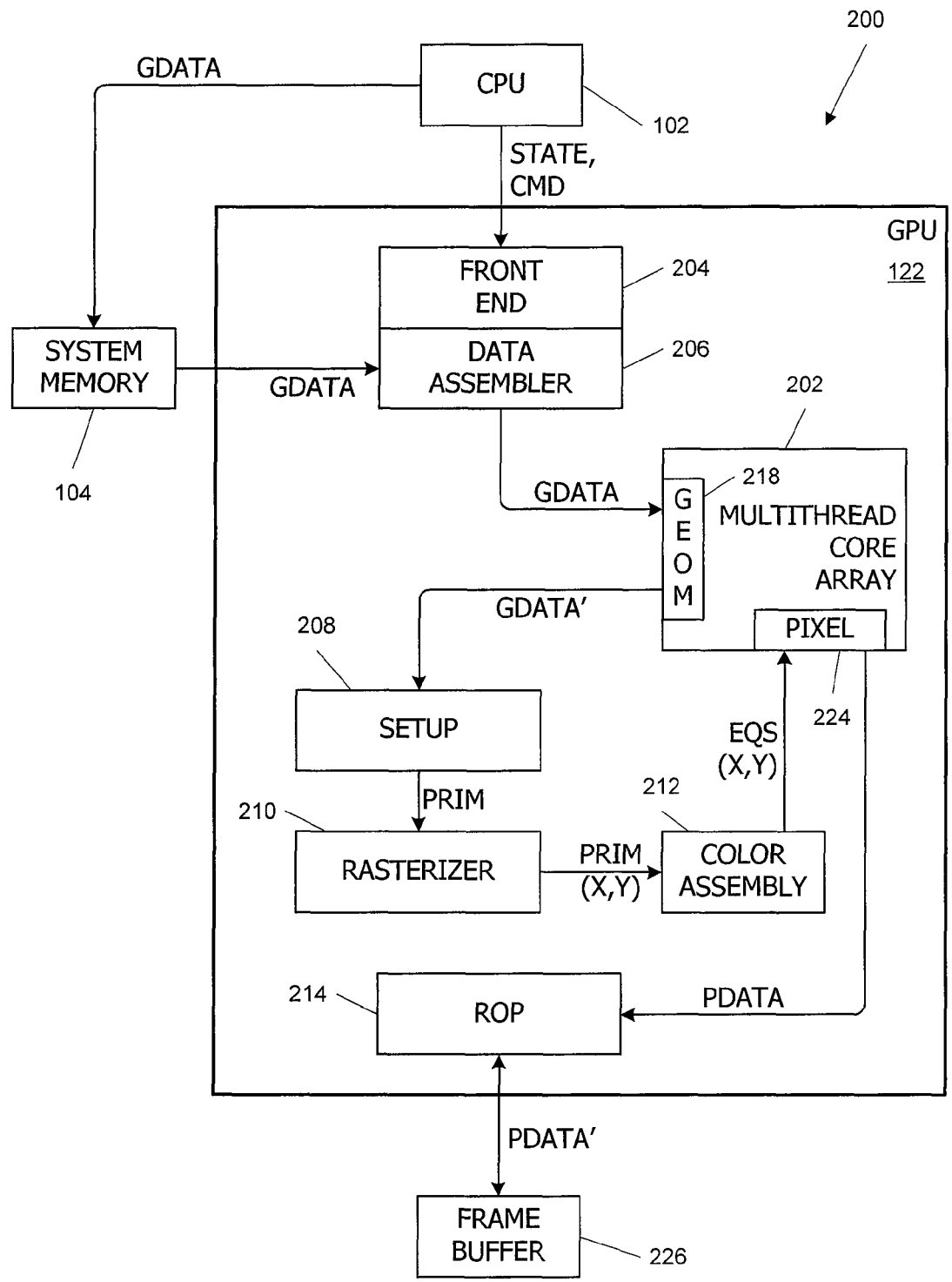
FIG. 2 is a block diagram of a rendering pipeline that can be implemented in a GPU shown in FIG. 1 according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operate as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader. Conventional supersampling techniques may sample multiple colors at multiple locations within the pixel, while conventional multisampling techniques sample just one color at multiple locations within the pixel.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a pixel shader program to interpolate a value for the attribute at any location within the primitive; conventional techniques can be used to generate the equations. For instance, in one embodiment, color assembly module 212 generates coefficients A, B, and C for a plane equation of the form U=Ax+By+C for each attribute U.

Color assembly module 212 provides the attribute equations (EQS, which may include e.g., the plane-equation coefficients A, B and C) for each primitive that covers at least one sample location of a pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel that includes at least one sample area covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operate as a geometry shader, receiving and executing geometry program instructions; and at still other times the same processing engine may operate as a pixel shader, receiving and executing pixel shader program instructions. It will be appreciated that the multithreaded core array can provide natural load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. Here, ROP 214 may represent an example of a specialized graphics function module capable of performing one class of graphics operations associated with a particular stage of graphics processing. Specifically, ROP 214 is capable of performing operations on frame buffer data for scan out to a display. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Thus, geometry module 218 and pixel module 224 represent different work distribution units, each capable of distributing work relating to a particular class of graphics operations to multithreaded core array 202. At the same time, geometry module 218 and pixel module 224 also represent different work collection units, each capable of collecting results relating to a particular class of graphics operations from multithreaded core array 202.

Multithreaded Core Array Configuration

Figure 3:
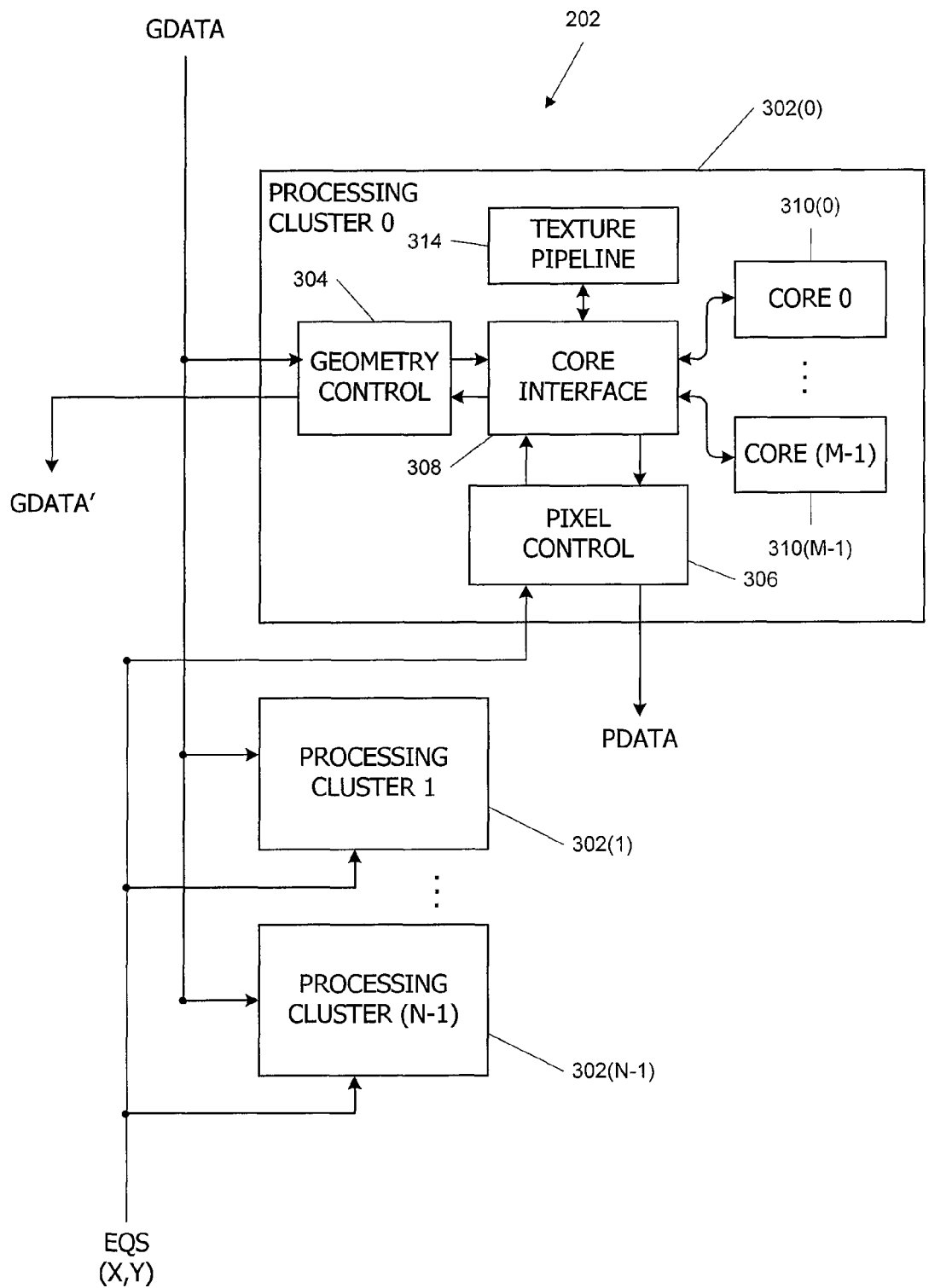
FIG. 3 is a block diagram of multithreaded core array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention. A hierarchical structure is adopted in multithreaded core array 202. This structure includes various components on multiple levels of hierarchy, as described below.

In this embodiment, multithreaded core array 202 includes some number (N) of processing clusters 302. This may be viewed as a first level of hierarchy. As such, processor cluster 302 may represent a plurality of similarly structured first level components. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

The contents of each processing cluster 302 shown in FIG. 3 may represent a combined function module. Such a combined function module is capable of performing multiple classes of graphics operations. Each class of graphics operations may be associated with a different stage of graphics processing. For example, the classes of operations handled by each processing cluster 302 include vertex shading operations, geometry shading operations, pixel shading operations, and texture operations. These classes of operations occur at different stages of graphics processing, as discussed previously.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface.

This may be viewed as a second level of hierarchy. As such, cores 310 may represent a plurality of similarly structured second level components positioned within each of the first level components (processor clusters 302). Each processor cluster 302 is adapted to distribute work to the plurality of cores 310 positioned within that processor cluster 302, as discussed later.

Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314. Each of the cores 310 has an associated texture pipeline 314. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads. According to an alternative embodiment, texture pipeline 314 is a shared texture pipeline that is shared among cores 310, and core interface 308 coordinates access to the shared texture pipeline.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts the data. In still another embodiment, processing clusters are selected based on properties of the input data, such as the screen coordinates of pixels to be processed.

According to another embodiment, multithreaded core array 202 may also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Computations that lend themselves to data parallel decomposition may be processed by the application of the same processing algorithm to different portions of an input data set in order to effect a transformation of the input data set to an output data set. In a multithreaded environment such computations may be advantageously executed in parallel by assigning a different portion of the data set to a thread of multithreaded core array 202. Threads may be used to implement a wide variety range of mathematical and logical operations including conditional or branching execution paths and direct and/or indirect memory accesses.

Like the operations related to graphics-related operations described above, operations for general-purpose computing can be distributed to the processing cluster's multithreaded core array 202 in various ways. In some embodiments, data to be processed is forwarded from one processing cluster to the next until a processing cluster with capacity to processes the data accepts the data. In another embodiment, processing clusters may be selected based upon properties of the input data and/or the operation to be performed upon the input data.

Core Architecture

Figure 4:
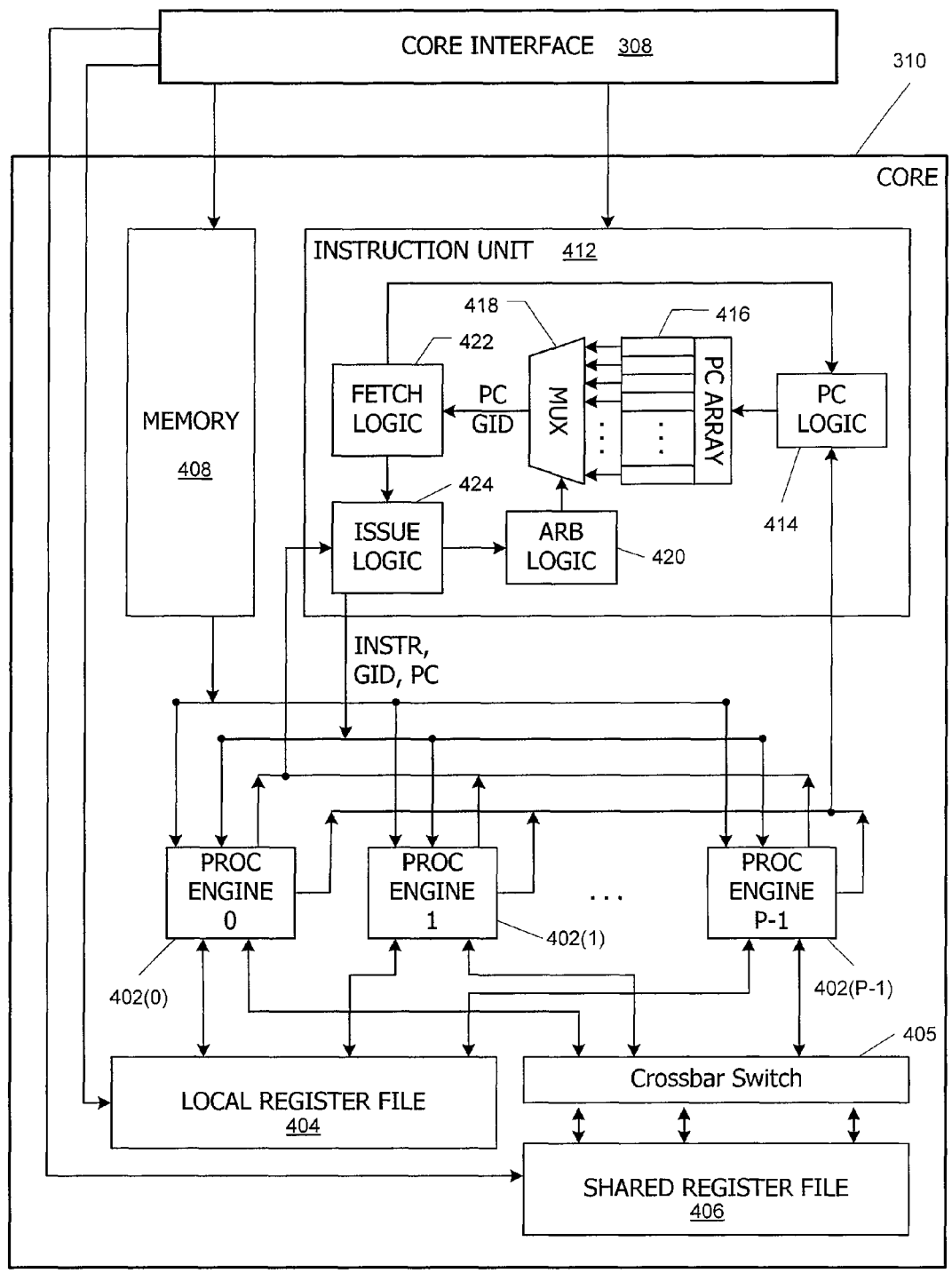
FIG. 4 is a block diagram of a core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. This may be viewed as a third level of hierarchy. As such, processing engines 402 may represent a plurality of similarly structured third level components positioned within each of the second level components (cores 310). Each core 310 is adapted to distribute work to the plurality of processing engines 402 positioned within that core 310, as discussed later.

Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations. For example, since the functional-units support a wide variety of operations, the functional units may be used to perform not only graphics processing operations but also for general-purpose computing operations.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register file 404 is advantageously large enough to support multiple concurrent threads per processing engine 402.

Each processing engine 402 also has access, via a crossbar switch 405, to a shared register file 406 that is shared among all of the processing engines 402 in core 310. Shared register file 406 may be as large as desired, and in some embodiments, any processing engine 402 can read to or write from any location in shared register file 406. In addition to shared register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs, and/or other program data, such as results produced by executing general-purpose computing program instructions. In some embodiments, processing engines 402 may also have access to additional off-chip shared memory (not shown), which might be located, e.g., within graphics memory 124 of FIG. 1.

In one embodiment, each processing engine 402 is multithreaded and can execute up to some number G (e.g., 24) of threads concurrently, e.g., by maintaining current state information associated with each thread in a different portion of its allocated lane in local register file 406. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on. Furthermore, according to embodiments where processing engine 402 may be used to perform general-purpose computing tasks, processing engine 402 may also rapidly switch between threads executing general-purpose computing program instructions.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multithreaded, supporting up to G threads, core 310 in this embodiment can have up to P*G threads in flight concurrently. For instance, if P=16 and G=24, then core 310 supports up to 384 concurrent threads. According to an embodiment, instruction unit may issue multiple instructions per processing cycle.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.)

Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread may be included with the instruction. Processing engine 402 uses group index GID as a context identifier, e.g., to determine which portion of its allocated lane in local register file 404 should be used when executing the instruction. Thus, in a given cycle, all processing engines 402 in core 310 are nominally executing the same instruction for different threads in the same group. In some embodiments, an active mask is applied at instruction issue to control which processing engines 402 execute the instruction so that an instruction can be executed in parallel for a subset of the threads in the SIMD group.

Instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on an active mask associated with the group index GID. In one embodiment, the active mask reflects the presence or absence of idle threads in the SIMD group and/or divergence in the execution paths taken by different threads in the SIMD group.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 allocates sufficient space for an input buffer (e.g., in shared register file 406 or local register file 404) for each processing engine 402 to execute one vertex thread, then loads the vertex data. In one embodiment, all data for the first vertex in the group is loaded into a lane of the input buffer allocated to processing engine 402(0), all data for the second vertex is in a lane of the input buffer allocated to processing engine 402(1), and so on. In some embodiments, data for multiple vertices in the group can be loaded in parallel.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion.

It should be noted that although all threads within a group are executing the same program and are initially synchronized with each other, the execution paths of different threads in the group might diverge during the course of program execution. Instruction unit 412 advantageously manages instruction fetch and issue for each SIMD group so as to ensure that threads in a group that have diverged eventually resynchronize. For instance, in one embodiment, instruction unit 412 maintains a branch token stack for each SIMD group. If a branch is taken by some threads in a SIMD group ("taken threads") but not by others ("not-taken threads"), a token is pushed onto the SIMD group's branch token stack. The token includes a mask identifying the not-taken threads. Instruction unit 412 continues to fetch instructions for the taken threads; these instructions are issued to all processing engines 402 with an active mask set such that the instructions are executed for the taken threads but not for the not-taken threads. Execution of the taken threads continues until a point in the instruction stream at which the branch-taken path and the branch-not-taken path merge. The merge point can be identified, e.g., by a flag or other indicator associated with the instruction where the merge occurs.

Once the merge point is reached, instruction unit 412 pops the token off the branch token stack and begins fetching instructions for the not-taken threads; these instructions are issued to all processing engines 402 with the active mask set such that the instructions are executed for not-taken threads but not for taken threads. Execution of the not-taken threads continues until the merge point is reached. Thereafter, the taken and not-taken active masks are merged into a single active mask, and fetching and executing continues.

It will be appreciated that the core architecture described herein is illustrative and that variations and modifications are possible. Any number of processing units may be included. In some embodiments, each processing unit has its own local register file, and the allocation of local register file entries per thread can be fixed or configurable as desired.

In some embodiments, core 310 is operated at a higher clock rate than core interface 308, allowing the core to process more data using less hardware in a given amount of time. For instance, core 310 can be operated at a clock rate that is twice the clock rate of core interface 308. If core 310 includes P processing engines 402 producing data at twice the core interface clock rate, then core 310 can produce 2*P results per core interface clock. Provided there is sufficient space in local register file 404, from the perspective of core interface 308, the situation is effectively identical to a core with 2*P processing units. Thus, P-way SIMD parallelism could be produced either by including P processing units in core 310 and operating core 310 at the same clock rate as core interface 308 or by including P/2 processing units in core 310 and operating core 310 at twice the clock rate of core interface 308. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 424 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

Figure 5:
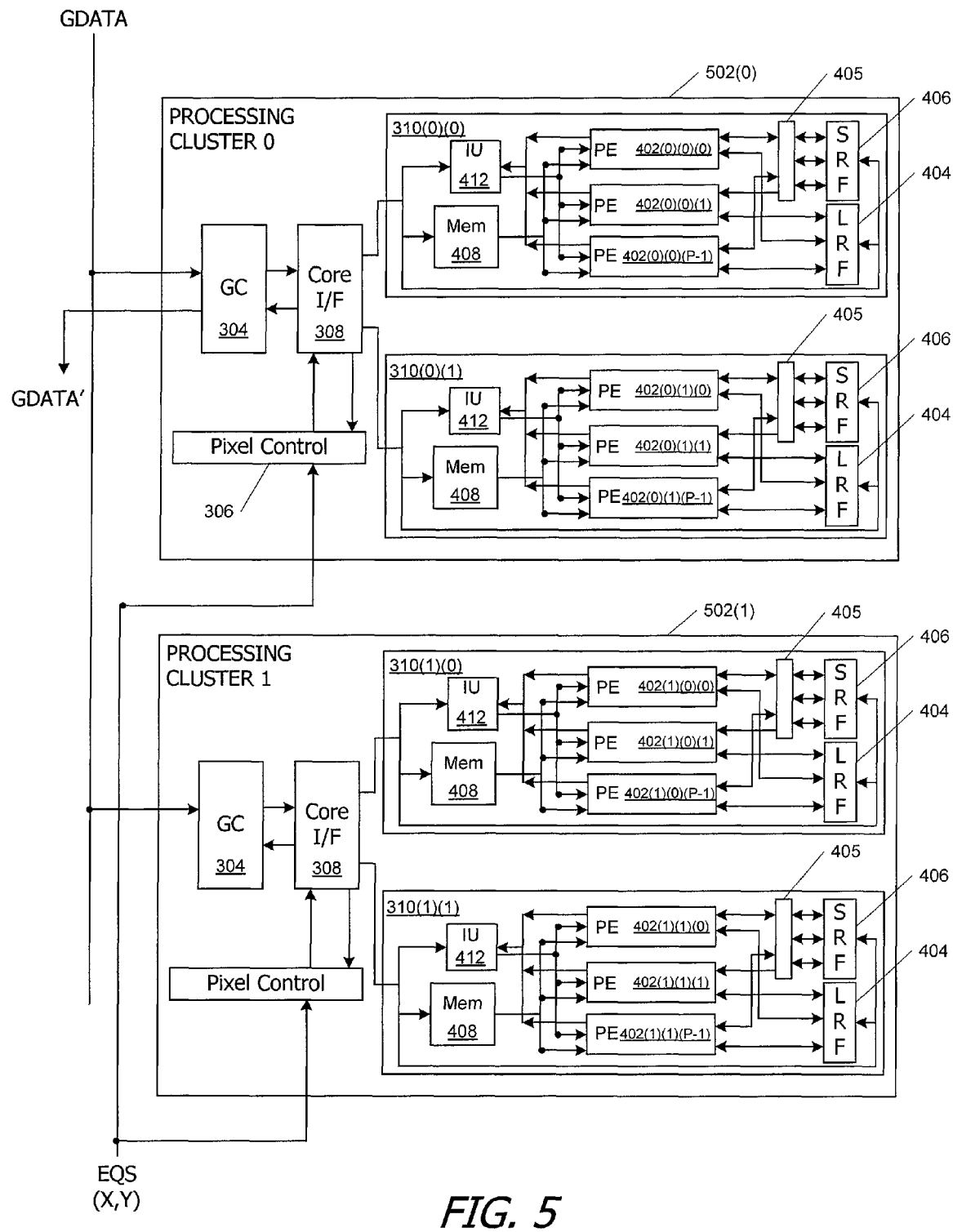
FIG. 5 is another block diagram of a multithreaded core array according to an embodiment of the present invention.

FIG. 5 is block diagram of a multithreaded core array 500 that illustrates a three-level hierarchy according to an embodiment. FIG. 5 illustrates a multithreaded core array 502 similar to multithreaded core array 202 described above. Multithreaded core array 502 includes a three-level hierarchical arrangement with the first level of the hierarchy comprising a plurality of processing clusters, the second level of the hierarchy comprising a plurality processing cores, and the third level of the hierarchy comprises a plurality of processing engines.

The first level of the hierarchy of multithreaded core array 500 includes processing cluster 502(0) and processing cluster 502(1). One skilled in the art will recognize that other embodiments may include a different number of processing clusters. For example, some embodiments may include a single processing cluster while other embodiments may include more than two processing clusters. Processing cluster 502(0) and processing cluster 502(1) may be substantially similar in design to processing cluster 302(0) and 302(1) described above.

The second level of the hierarchy of multithreaded core array 500 includes processing core 310(0)(0), processing core 310(0)(1), processing core 310(1)(0), and processing core 310(1)(1). Processing core 310(0)(0) and processing core 310(0)(1) are included within processing cluster 502(0) and processing core 310(1)(0) and processing core 310(1)(1) are included within processing cluster 502(1). The structure of processing core 310(0)(0), processing core 310(0)(1), processing core 310(1)(0), and processing core 310(1)(1) may be of a substantially similar structure as processing core 310 described above. One skilled in the art will recognize that the number of processing cores included in each processing cluster may vary and that the structure of each of the processing cores may be of a similar design or may be implemented using different designs.

The third level of the hierarchy of multithreaded core array 500 includes a processing engine 402(0)(0)(0), processing engine 402(0)(0)(1), processing engine 402(0)(0)(P-1), which are components of processing core 310(0)(0), processing engine 402(0)(1)(0), processing engine 402(0)(1)(1), and processing engine 402(0)(1)(P-1), which are components processing core 310(0)(1), processing engine 402(1)(0)(0), processing engine 402(1)(0)(1), processing engine 402(1)(0)(P-1), which are included in processing core 310(1)(0), and processing engine 402(1)(1)(0), processing engine 402(1)(1)(1), processing engine 402(1)(1)(P-1), which are included in processing core 310(1)(1).

One skilled in the art will recognize that the number of processing cores included in each processing cluster may vary and that the structure of each of the processing engines may be of a similar structure or may alternatively be implemented using different designs. Furthermore, one skilled in the art will recognize that the number of processing engines included in each processing core may vary and that the structure of each of the processing engines may be similar or may be implemented using different designs. The structure of multithreaded core array 500 included above is merely illustrative of one embodiment of the present invention. One skilled in the art will recognize that other configurations are possible.

The hierarchical structure of multithreaded core array 500 also advantageously facilitates the rapid design of derivative chip designs. For example, a more powerful multithreaded core array design could be implemented merely by adding additional components at one or more of the levels of the hierarchy. For example, according to some embodiments, additional processing engines may be added to one or more of the processing cores of multithreaded core array 502. According to another embodiment, additional processing cores may be added to one or more processing clusters. According to yet other embodiments, the additional processing clusters may be added to the multithreaded core array.

Figure 6:
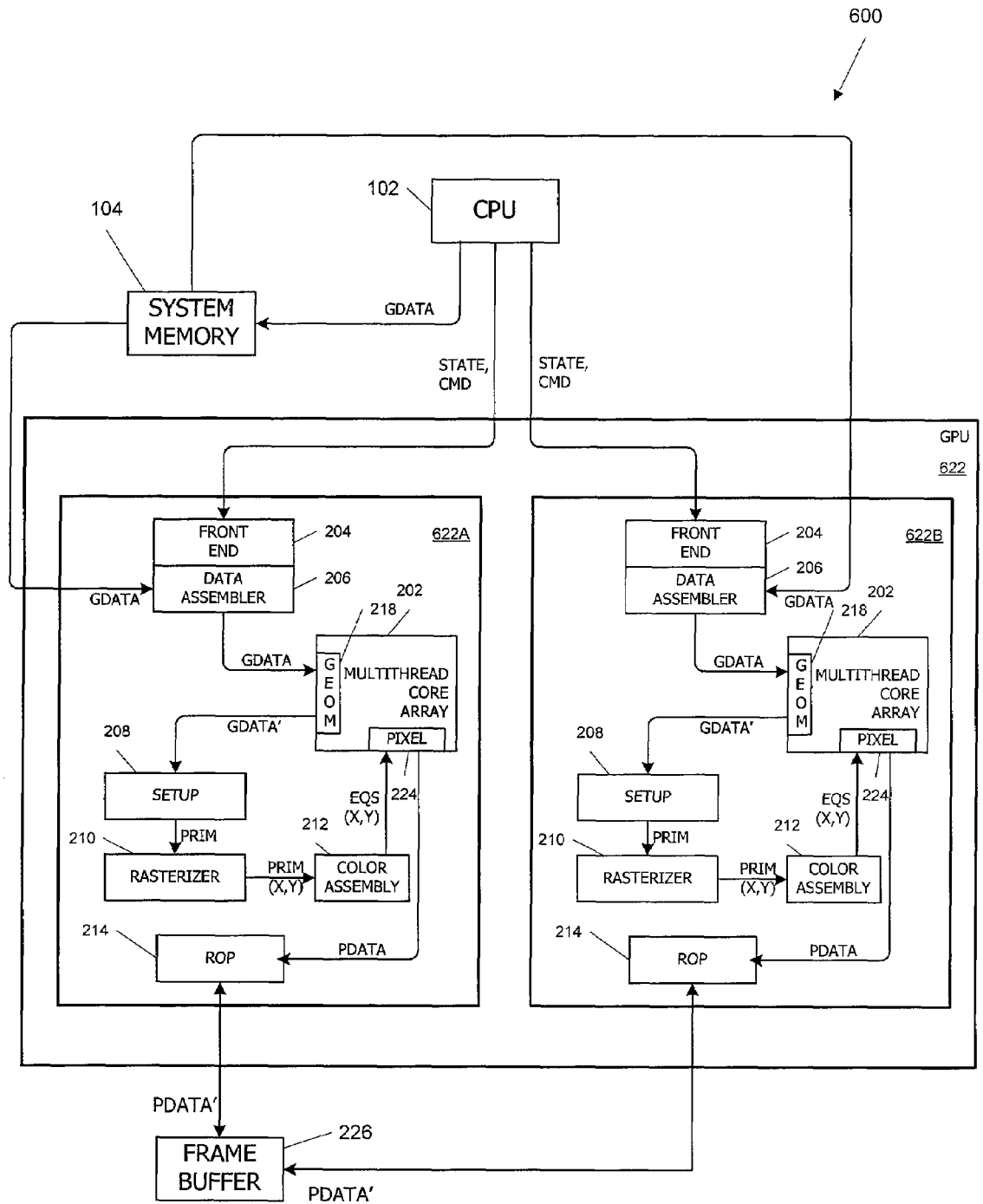
FIG. 6 is a block diagram of another rendering pipeline that can be implemented in a GPU shown in FIG. 1 according to another embodiment of the present invention.

FIG. 6 is a block diagram of another rendering pipeline 600 that can be implemented in a GPU, such as GPU 122 shown in FIG. 1, according to an embodiment of the present invention. Rendering pipeline 600 is a hierarchical implementation of a rendering pipeline within GPU 622 wherein GPU 622 includes multiple complete rendering pipelines (rendering pipeline 622A and rendering pipeline 622B) at the top level of the hierarchy. Rendering pipeline 622A and rendering pipeline 622B are of a similar configuration as rendering pipeline 200 of FIG. 2 described above. However, unlike the embodiment illustrated in FIG. 2 that includes only a single instance of many of the components of the rendering pipeline, such as front end 204, data assembler 206, setup module 208, rasterizer 210, a color assembly module 212, and raster operations module (ROP) 214, rendering pipeline 600 includes fully redundant rendering pipelines at the top level of the hierarchy. As a result, if one of the rendering pipelines ceases to function, GPU 622 can continue to operate using the remaining functional rendering pipeline. For example, if the ROP 214 of rendering pipeline 622A malfunctions, rendering pipeline 622A may be shut down by GPU 622, but GPU 622 may continue to operate using rendering pipeline 622B.

GPU 622 is illustrated as including only two rendering pipelines. However, one skilled in the art will recognize that according to other embodiments, a GPU may include more than two rendering pipelines in order to further increase the processing power and the redundancy of the system.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A processor for performing operations including graphics operations, the processor comprising:
   at a first level of hierarchy, a plurality of similarly structured first level circuits, wherein each of the plurality of similarly structured first level circuits includes at least one combined function module capable of performing multiple classes of graphics operations, each of the multiple classes of graphics operations being associated with a different stage of graphics processing, the multiple classes of graphics operations comprising vertex shading operations, geometry shading operations, and pixel shading operations; and
   at a second level of hierarchy, a plurality of similarly structured second level circuits positioned within each one of the plurality of similarly structured first level circuits, wherein each of the plurality of similarly structured second level circuits is capable of carrying out different operations from the multiple classes of graphics operations, wherein each first level circuit is adapted to distribute work to the plurality of similarly structured second level circuits positioned within the first level circuit.

2. The processor of claim 1 further comprising, at a third level of hierarchy, a plurality of similarly structured third level circuits positioned within each one of the plurality of similarly structured second level circuits, wherein each second level circuit is adapted to distribute work to the plurality of similarly structured third level circuits positioned within the second level circuit.

3. The processor of claim 2, wherein the processor also performs general-purpose computing operations other than graphics operations, wherein the plurality of similarly structured second level circuits distribute the general-purpose computing operations to the plurality of similarly structured third level circuits.

4. The processor of claim 2 wherein the processor is configured to disable a malfunctioning circuit at the first level of hierarchy, the second level of hierarchy, or the third level of hierarchy, and to continue operating using remaining circuits at a same level of hierarchy as the malfunctioning circuit.

5. The processor of claim 1 wherein the processor may also be used to perform general-purpose computing operations other than graphics operations, and wherein the plurality of similarly structured first level circuits distribute the general-purpose computing operations to the plurality of similarly structured second level circuits.

6. The processor of claim 1 wherein the combined function module is capable of performing a class of graphics operations carried out based on vertex data.

7. The processor of claim 1 wherein the combined function module is capable of performing a class of graphics operations carried out based on geometry data.

8. The processor of claim 1 wherein the combined function module is capable of performing a class of graphics operations carried out based on pixel data.

9. The processor of claim 1 wherein the processor further includes at least one specialized graphics function module capable of performing one class of graphics operations associated with a particular stage of graphics processing.

10. The processor of claim 9 wherein the at least one specialized graphics function module is capable of performing a class of graphics operations carried out based on frame buffer data for scan out to a display.

11. The processor of claim 1 wherein the processor is capable of achieving single-instruction-multiple-data (SIMD) operation on at least one of the first and second levels of hierarchy, by issuing a single instruction to a plurality of circuits, causing each of the plurality of circuits to carry out the single instruction using different data.

12. The processor of claim 1 wherein the processor is capable of achieving multithreaded operation on at least one of the first and second levels of hierarchy, by issuing multiple threads of instructions to each of a plurality of circuits.

13. The processor of claim 1 wherein the processor further comprises multiple work distribution units, each work distribution unit capable of distributing work to be performed relating to one of the classes of graphics operations to at least one combined function module.

14. A method for performing operations including graphics operations, the method comprising:
   at a first level of hierarchy, operating a plurality of similarly structured first level circuits within a processor, wherein each of the plurality of similarly structured first level circuits includes at least one combined function module capable of performing multiple classes of graphics operations, each of the multiple classes of graphics operations being associated with a different stage of graphics processing, the multiple classes of graphics operations comprising vertex shading operations, geometry shading operations, and pixel shading operations; and
   at a second level of hierarchy, operating a plurality of similarly structured second level circuits positioned within each one of the plurality of similarly structured first level circuits, wherein each of the plurality of similarly structured second level circuits is capable of carrying out different operations from the multiple classes of graphics operations, wherein each first level circuit is adapted to distribute work to the plurality of similarly structured second level circuits positioned within the first level circuit.

15. The method of claim 14 further comprising, at a third level of hierarchy, operating a plurality of similarly structured third level circuits positioned within each one of the plurality of similarly structured second level circuits, wherein each second level circuit is adapted to distribute work to the plurality of similarly structured third level circuits positioned within the second level circuit.

16. The method of claim 14 wherein the combined function module performs a class of graphics operations carried out based on vertex data.

17. The method of claim 14 wherein the combined function module performs a class of graphics operations carried out based on geometry data.

18. The method of claim 14 wherein the combined function module performs a class of graphics operations carried out based on pixel data.

19. The method of claim 14 wherein the processor further includes at least one specialized graphics function module that performs one class of graphics operations associated with a particular stage of graphics processing.

20. The method of claim 19 wherein the at least one specialized graphics function module performs a class of graphics operations carried out based on frame buffer data for scan out to a display.

21. The method of claim 14 wherein the processor achieves single-instruction-multiple-data (SIMD) operation on at least one of the first and second levels of hierarchy, by issuing a single instruction to a plurality of circuits, causing each of the plurality of circuits to carry out the single instruction using different data.

22. The method of claim 14 wherein the processor achieves multithreaded operation on at least one of the first and second levels of hierarchy, by issuing multiple threads of instructions to each of a plurality of circuits.

23. The method of claim 14 wherein the processor further comprises multiple work distribution units, each work distribution unit distributing work to be performed relating to one of the classes of graphics operations to at least one combined function module.

24. The method of claim 14 further comprising:
operating the plurality of similarly structured first level circuits and the plurality of similarly structured second level circuits to execute general-purpose computing operations, wherein the first level circuits distribute the work to the plurality of similarly structured second level circuits in order to execute the general-purpose computing operations.

25. The method of claim 15 further comprising:
operating the plurality of similarly structured third level circuits to execute general-purpose computing operations, the general-purpose computing operations being distributed to the plurality of similarly structured circuits by the plurality of similarly structured second level circuits.

* * * * *